United States Patent
Huang

(10) Patent No.: US 12,353,069 B2
(45) Date of Patent: Jul. 8, 2025

(54) WAVEGUIDE HAVING DOPED PILLAR STRUCTURES TO IMPROVE MODULATOR EFFICIENCY

(71) Applicant: Taiwan Semiconductor Manufacturing Co., Ltd., Hsinchu (TW)

(72) Inventor: Yuan-Sheng Huang, Taichung (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 0 days.

(21) Appl. No.: 17/391,285

(22) Filed: Aug. 2, 2021

(65) Prior Publication Data

US 2022/0357603 A1    Nov. 10, 2022

Related U.S. Application Data

(60) Provisional application No. 63/184,910, filed on May 6, 2021.

(51) Int. Cl.
*G02F 1/025* (2006.01)
*G02F 1/225* (2006.01)

(52) U.S. Cl.
CPC ............ *G02F 1/025* (2013.01); *G02F 1/2257* (2013.01); *G02F 2201/063* (2013.01)

(58) Field of Classification Search
CPC ........ G02F 1/025; G02F 1/225; G02F 1/2255; G02F 1/2257
USPC ........................................................ 385/1–3
See application file for complete search history.

(56) References Cited

U.S. PATENT DOCUMENTS

| | | | | |
|---|---|---|---|---|
| 7,603,016 | B1 * | 10/2009 | Soref | B82Y 20/00 385/129 |
| 7,657,146 | B2 * | 2/2010 | Laval | G02F 1/025 385/129 |
| 8,548,281 | B2 * | 10/2013 | Kim | G02F 1/025 385/129 |
| 10,162,200 | B1 * | 12/2018 | Jou | G02F 1/025 |
| 2010/0232742 | A1 | 9/2010 | Yamada | |
| 2011/0176762 | A1 * | 7/2011 | Fujikata | G02F 1/025 427/64 |
| 2012/0087613 | A1 | 4/2012 | Rasras | |

(Continued)

FOREIGN PATENT DOCUMENTS

| | | | | |
|---|---|---|---|---|
| CN | 204927295 | * | 12/2015 | H01L 29/78 |
| EP | 1833095 | * | 9/2007 | H01L 31/0352 |

OTHER PUBLICATIONS

U.S. Appl. No. 16/733,488, filed Jan. 3, 2020.

*Primary Examiner* — Robert Tavlykaev
(74) *Attorney, Agent, or Firm* — Eschweiler & Potashnik, LLC

(57) ABSTRACT

Various embodiments of the present disclosure are directed towards a semiconductor structure comprising a waveguide. The waveguide has an input region and an output region. The input region is configured to receive light. The waveguide comprises a lower doped structure comprising a first doping type and a plurality of doped pillar structures disposed within the lower doped structure. The doped pillar structures comprise a second doping type opposite the first doping type. The doped pillar structures extend from a top surface of the lower doped structure to a point below the top surface of the lower doped structure.

19 Claims, 19 Drawing Sheets

(56) References Cited

U.S. PATENT DOCUMENTS

| | | | |
|---|---|---|---|
| 2017/0336564 A1* | 11/2017 | Soref | G02F 1/3133 |
| 2019/0377205 A1* | 12/2019 | Kim | G02F 1/025 |
| 2020/0264366 A1 | 8/2020 | Kuindersma et al. | |

* cited by examiner

WAVEGUIDE HAVING DOPED PILLAR STRUCTURES TO IMPROVE MODULATOR EFFICIENCY

REFERENCE TO RELATED APPLICATION

This Application claims the benefit of U.S. Provisional Application No. 63/184,910, filed on May 6, 2021, the contents of which are hereby incorporated by reference in their entirety.

BACKGROUND

Optical circuits may comprise multiple photonic functions/devices and optical waveguides. The optical waveguides are configured to confine and guide light from a first point on an integrated chip (IC) to a second point on the IC with minimal attenuation. Optical waveguides may be arranged close to one another such that light may be split and/or transferred between nearby optical waveguides. An optical waveguide may also be configured to selectively change the phase, wavelength, frequency, and/or other properties of light that passes through the optical waveguide.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1A:
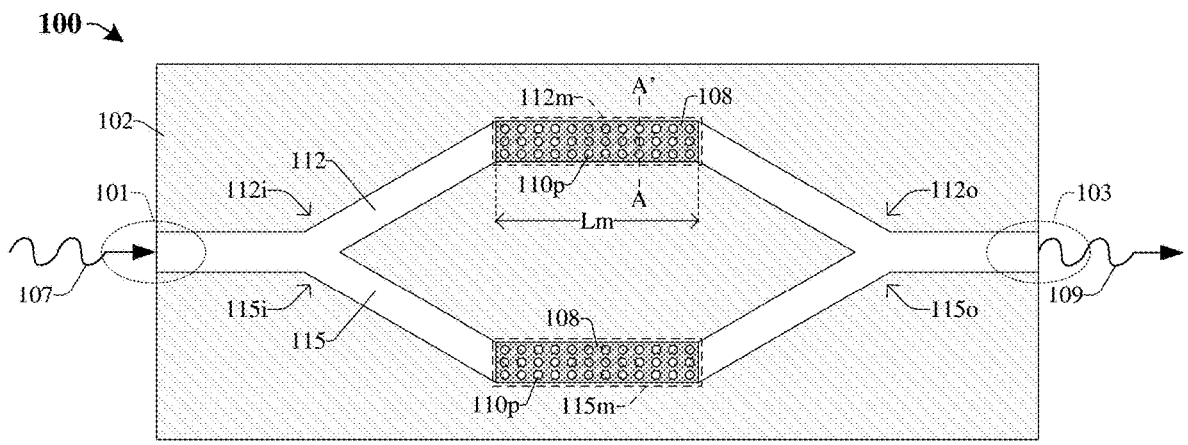
FIGS. 1A and 1B illustrate various views of some embodiments of a photonic device having a first waveguide and a second waveguide that include a plurality of doped pillar structures extending into a lower doped structure.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

Photonic devices relate to the transmission and/or processing of photons (e.g., light) incident on the photonic devices. Photonic devices comprise waveguides, which guide or "route" light through the photonic device. The waveguides often comprise some type of semiconductor material having advantageous optical, thermal, and electrical properties. Multiple waveguides may be arranged near one another in photonic devices to modulate the light, to split light, to combine light, or the like such that data in the form of light can be transferred and/or manipulated by the photonic device. For example, the waveguides may utilize phase modulation on the light to convey the information over long or short distances.

A photonic device may include an input terminal and an output terminal. A first waveguide and a second waveguide may branch off from the input terminal and then recombine at the output terminal, such that there are two pathways or channels through which light can travel through the photonic device. The first waveguide may be in close proximity or in direct contact with the second waveguide, such that the first and second waveguides are optically coupled to one another. During operation of the photonic device, input light is received at the input terminal with an initial phase, and is then split to pass along the first waveguide and the second waveguide, before being recombined and provided as output light at the output terminal. Because the first and second waveguides are optically coupled together, the output light can be phase shifted due to constructive or destructive interference arising from the first and second waveguides.

The phase shift of the output light may be controlled by adjusting a doping scheme and a length of the first and second waveguides. For example, the first and second waveguides each comprise a first doped region comprising a first doping type (e.g., n-type) abutting a second doped region comprising a second doping type (e.g., p-type) opposite the first doping type. This results in the formation of a PN junction at the intersection of the first and second doped regions that extends along a length of each of the first and second waveguides. As an area of the PN junction increases, a number of charge carriers within the waveguide increases, thereby increasing a modulation efficiency of the first and second waveguides. In an effort to increase the area of the PN junction (and thereby increasing modulation efficiency), lengths of the first and second doped regions are increased. However, this reduces a number of photonic devices that may be disposed over a single semiconductor substrate (e.g., decreases device density) and increases costs associated with forming the photonic devices.

Accordingly, various embodiments of the present application are directed towards a photonic device comprising a waveguide that includes a lower doped structure and an upper doped structure disposed within a modulation region of the waveguide. The upper doped structure comprises an upper doped body structure overlying the lower doped structure and a plurality of doped pillar structures continuously extending from the upper doped body structure to a point below a top surface of the lower doped structure. The lower doped structure continuously wraps around and abuts an outer surface of each doped pillar structure at a plurality of interface regions. The lower doped structure comprises a first doping type (e.g., n-type) and the upper doped structure (including both the doped pillar structures and the upper doped body structure) comprises a second doping type (e.g., p-type) opposite the first doping type, such that PN junctions are formed at the plurality of interface regions. Because the lower doped structure continuously wraps around the outer surface of each doped pillar structure, an area of the PN junctions in the modulation region is greater than an area of a PN junction that spans a length of the modulation region of the waveguide. As a result, a length of the modulation region of the waveguide may be decreased while maintaining or increasing an area of the PN junction, thereby maintaining or increasing the modulation efficiency of the photonic device while decreasing an overall size of the waveguide. Thus, a number of photonic devices disposed within a given lateral distance of a photonic device region may be increased without decreasing the area of PN junctions in the waveguide(s) of the photonic devices. This, in part, facilitates increasing a device density without reducing a performance of the photonic devices.

Figure 1B:
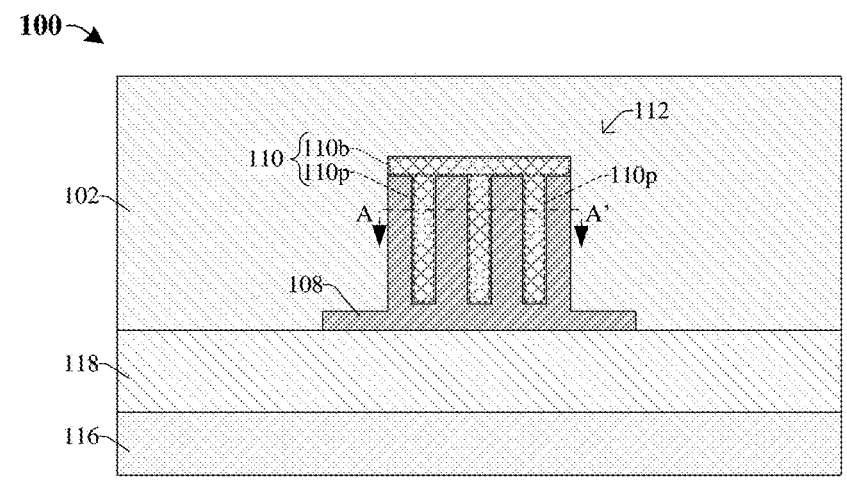

FIGS. 1A and 1B illustrate various views of some embodiments of a photonic device 100 having a first waveguide 112 and a second waveguide 115 that include a plurality of doped pillar structures 110p extending into a lower doped structure 108. FIG. 1A illustrates a top view of some embodiments of the photonic device 100 taken along the line A-A' of FIG. 1B. FIG. 1B illustrates a cross-sectional view of some embodiments of the photonic device 100 taken along the line A-A' of FIG. 1A.

The photonic device 100 includes the first waveguide 112 and the second waveguide 115 disposed within a dielectric structure 102 that overlies a substrate 116. Further, a bulk dielectric structure 118 is disposed between the substrate 116 and the first and second waveguides 112, 115. The photonic device 100 further includes an input terminal 101 and an output terminal 103, where the first and second waveguides 112, 115 branch off from the input terminal 101 and then recombine at the output terminal 103. This provides two pathways or channels through which light can travel through the photonic device 100. In some embodiments, the first waveguide 112 has a first input region 112i that is coupled to the input terminal 101 and a first output region 112o that is coupled to the output terminal 103, and the second waveguide 115 has a second input region 115i that is coupled to the input terminal 101 and a second output region 115o that is coupled to the output terminal 103. In various embodiments, the first input region 112i is coupled to the second input region 115i and the first output region 112o is coupled to the second output region 115o. In yet further embodiments, the first waveguide 112 and the second waveguide 115 comprise a semiconductor material (e.g., polycrystalline silicon, monocrystalline, silicon, or another suitable material).

In various embodiments, impingent light 107 is received at the input terminal 101 with an initial phase, and is then split to pass along the first waveguide 112 and the second waveguide 115, before being recombined and provided as outgoing light 109 at the output terminal 103. In some embodiments, the outgoing light 109 may be modulated relative to the impingent light 107 after traversing the first and second waveguides 112, 115, such that the outgoing light 109 has a phase different from the initial phase of the impingent light 107. For example, because the first and second waveguides 112, 115 are optically coupled, the outgoing light 109 can be phase shifted due to constructive or destructive interference arising from the first and second waveguides 112, 115. In addition, the first waveguide 112 and the second waveguide 115 respectively comprise an upper doped structure 110 and a lower doped structure 108 within a first modulation region 112m and a second modulation region 115m. The upper doped structure 110 and the lower doped structure 108 of the first and second modulation regions 112m, 115m are configured to shift the velocity and/or phase of light traveling through a corresponding one of the first and second waveguides 112, 115 relative to that of the light traveling through regions of the first and second waveguides 112, 115 laterally offset from the first and second modulation regions 112m, 115m. In various embodiments, modulation of the light through the first and second modulation regions 112m, 115m may be controlled by adjusting a doping scheme of the lower and upper doped structures 108, 110, adjusting a voltage applied to the lower and upper doped structures 108, 110, and/or adjusting a length Lm of the first and second modulation regions 112m, 115m.

In some embodiments, the upper doped structure 110 comprises an upper doped body structure 110b and the plurality of doped pillar structures 110p that continuously extend from the upper doped body structure 110b into the lower doped structure 108. In some embodiments, the lower doped structure 108 continuously warps around and abuts an outer surface of each doped pillar structure in the plurality of doped pillar structures 110p at a plurality of interface regions. Further, the lower doped structure 108 comprises a first doping type (e.g., n-type) and the upper doped structure 110 comprises a second doping type (e.g., p-type) opposite the first doping type, such that PN junctions are formed at the plurality of interface regions. In addition, a top surface of the lower doped structure 108 continuously extends along and abuts a bottom surface of the upper doped body structure 110b such that a PN junction is formed at the interface of the lower doped structure 108 and the upper doped body structure 110b. Because the lower doped structure 108 continuously wraps around the outer surfaces the doped pillar structures 110p, an area of the PN junctions in the first and second modulation regions 112m, 115m is greater than an area of a PN junction that spans a length Lm of the first or second modulation regions 112m, 115m. As a result, an overall size the first and second waveguides 112, 115 may be decreased while maintaining or increasing the area of the PN junctions within the first and second modulation regions 112m, 115m, thereby maintaining or increasing the modulation efficiency of the photonic device 100. Thus, a number of photonic devices disposed within a given lateral distance over the substrate 116 may be increased without decreasing the area of PN junctions in the first and second waveguides.

This, in part, facilitates increasing a device density without reducing a performance of the first and second waveguides 112, 115.

Figure 2A:
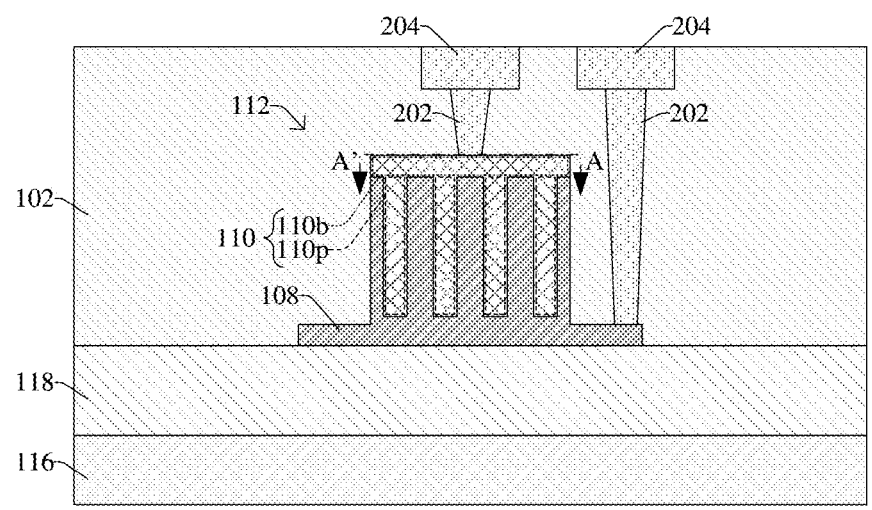
FIG. 2A illustrates a cross-sectional view of some embodiments of a photonic device having a first waveguide that comprises a plurality of doped pillar structures extending into a lower doped structure.

FIG. 2A illustrates a cross-sectional view of some embodiments of a photonic device 200 having a first waveguide 112 that comprises a plurality of doped pillar structures extending into a lower doped structure.

The first waveguide 112 overlies a substrate 116, and a bulk dielectric structure 118 is arranged between the first waveguide 112 and the substrate 116. A dielectric structure 102 overlies the first waveguide 112 and the substrate 116. The bulk dielectric structure 118 may, for example, be or comprise an oxide (e.g., silicon dioxide), another suitable oxide, a low-k dielectric material, another suitable dielectric material, or any combination of the foregoing. The dielectric structure 102 may, for example, comprises one or more layers of a low-k dielectric material, silicon nitride, silicon carbide, silicon dioxide, or another suitable dielectric material. Further, the substrate 116 may, for example, be or comprise bulk silicon, monocrystalline silicon, or another suitable semiconductor material.

The first waveguide 112 comprises a semiconductor material (e.g., monocrystalline silicon, polycrystalline silicon, etc.) configured to transport light. The first waveguide 112 comprises an upper doped structure 110 overlying a lower doped structure 108. In various embodiments, the lower doped structure 108 comprises a first doping type (e.g., n-type) and the upper doped structure 110 comprises a second doping type (e.g., p-type) opposite the first doping type. In some embodiments, the first doping type is n-type and the second doping type is p-type, or vice versa. Further, the upper doped structure 110 comprises an upper doped body structure 110b disposed along a top surface of the lower doped structure 108 and a plurality of doped pillar structures 110p continuously extending from the upper doped body structure 100b to a point below the top surface of the lower doped structure 108. A plurality of conductive vias 202 and a plurality of conductive wires 204 are disposed within the dielectric structure 102 and are electrically coupled to the upper doped structure 110 and the lower doped structure 108. In various embodiments, the upper doped structure 110 and the lower doped structure 108 are disposed within a first modulation region (e.g., 112m of FIG. 1A) of the first waveguide 112.

During operation of the photonic device 200, modulation of light traversing the first waveguide 112 may be achieved by the plasma dispersion effect, where a refractive index of the first waveguide 112 may be changed by manipulating a concentration of charge carriers within the first waveguide 112, thereby changing the phase of light as it traverses the first modulation region (e.g., 112m of FIG. 1A) of the first waveguide 112. In various embodiments, modulation efficiency of the first waveguide 112 may be represented by $V\pi L$, where V is the voltage applied to the lower doped structure 108 and the upper doped structure 110 within the first modulation region (e.g., 112m of FIG. 1A) and L is the length of the PN junction in the first modulation region (e.g., 112m of FIG. 1A). For example, in some embodiments, L may correspond to the length (Lm of FIG. 1A) of the first and/or second modulation regions (e.g., 112m, 115m of FIG. 1A). In addition, a voltage bias (e.g., a reverse bias) may be applied to the upper doped structure 110 and the lower doped structure 108 by way of the plurality of conductive vias and wires 202, 204, where the voltage bias increases a charge density across the first modulation region (e.g., 112m of FIG. 1A) and facilitates modulation of light in the first waveguide 112. By virtue of the lower doped structure 108 continuously wrapping around outer surfaces of the doped pillar structures 110p, an area of the PN junctions in the first modulation region (e.g., 112m of FIG. 1A) is increased relative to an area of a PN junction that is defined by a rectangular shape spanning the length (e.g., Lm of FIG. 1A) of the first modulation region (e.g., 112m of FIG. 1A). Accordingly, the modulation efficiency of the first waveguide may be maintained or increased while decreasing the length (e.g., Lm of FIG. 1A) of the first modulation region (e.g., 112m of FIG. 1A) and/or while decreasing a voltage bias applied to the upper doped structure 110 and the lower doped structure 108. Thus, the modulation efficiency of the first waveguide 112 may be increased while increasing a number of photonic devices disposed over the substrate 116 and/or decreasing a power consumption of the photonic device 200.

In some embodiments, the lower doped structure 108 comprises the first doping type (e.g., n-type) with a doping concentration of approximately $1 \times 10^{17}$ to approximately $1 \times 10^{18}$ atoms/cm$^3$, or another suitable doping concentration value. In further embodiments, the doped pillar structures 110p and the upper doped body structure 110b respectively comprise the second doping type (e.g., p-type) with a doping concentration of approximately $1 \times 10^{17}$ to approximately $1 \times 10^{18}$ atoms/cm$^3$, or another suitable doping concentration value. In yet further embodiments, the lower doped structure 108, the doped pillar structures 110p, and the upper doped body structure 110b respectively comprise a same doping concentration. In various embodiments, the lower doped structure 108 comprises a first semiconductor material (e.g., monocrystalline silicon) and the doped pillar structures 110p and the upper doped body structure 110b respectively comprise a second semiconductor material (e.g., polycrystalline silicon) different from the first semiconductor material. In yet further embodiments, the lower doped structure 108, the doped pillar structures 110p, and the upper doped body structure 110b respectively comprise a same semiconductor material (e.g., silicon, monocrystalline silicon, etc.) and may each be a doped region of a device layer. Further, the plurality of conductive vias and wires 202, 204 may, for example, respectively be or comprise copper, aluminum, titanium nitride, tantalum nitride, tungsten, ruthenium, another conductive material, or any combination of the foregoing.

Figure 2B:
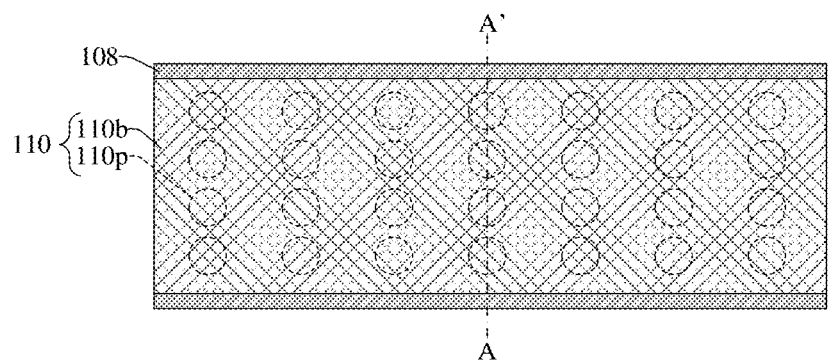
FIGS. 2B-2E illustrate top views of various embodiments of the photonic device of FIG. 2A.
Figure 2C:
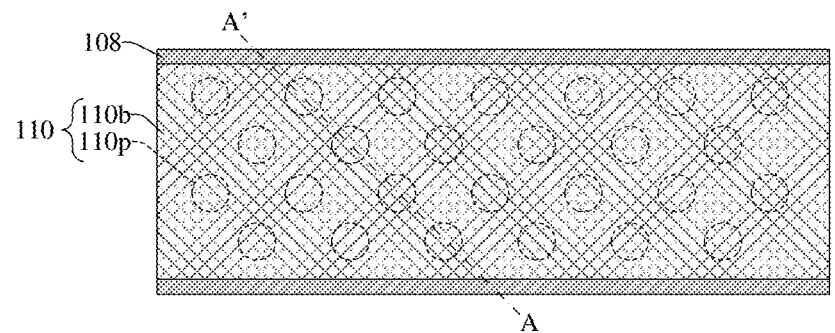
Figure 2D:
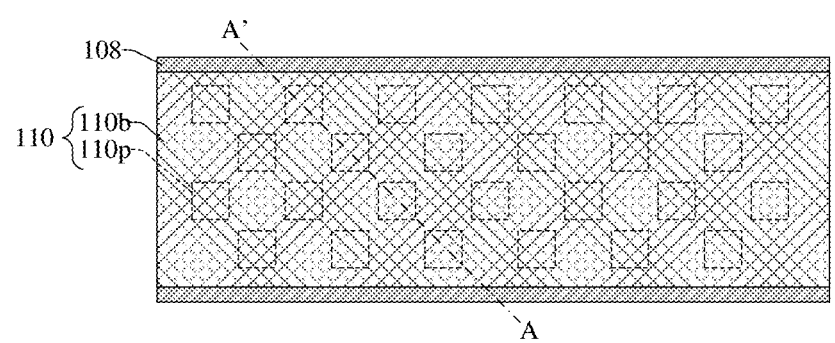
Figure 2E:
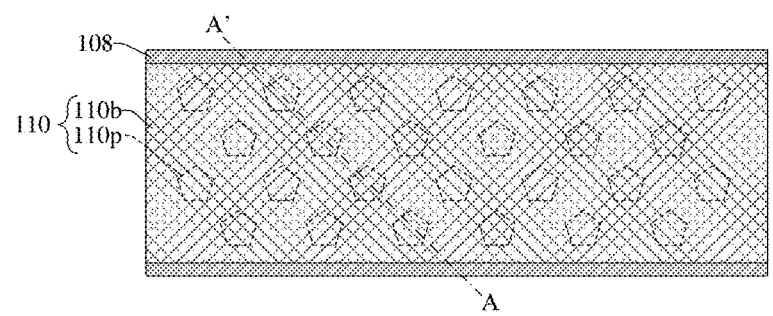

FIGS. 2B-2E illustrate various top views of some embodiments of the photonic device 200 of FIG. 2A taken along the line A-A' of FIG. 2A. For clarity and ease of illustration, the dielectric structure (102 of FIG. 2A) is omitted from the top views of FIGS. 2B-2E. With reference to FIGS. 2B and 2C, the plurality of doped pillar structures 110p have a circular shape when viewed from above. With reference to FIG. 2D, the plurality of doped pillar structures 110p have a rectangular or square shape when viewed from above. With reference to FIG. 2E, the plurality of doped pillar structures 110p have a pentagon shape when viewed from above. It will be appreciated that the plurality of doped pillar structures 110p may have an oval shape, a polygon shape, or another suitable shape when viewed from above.

Figure 3:
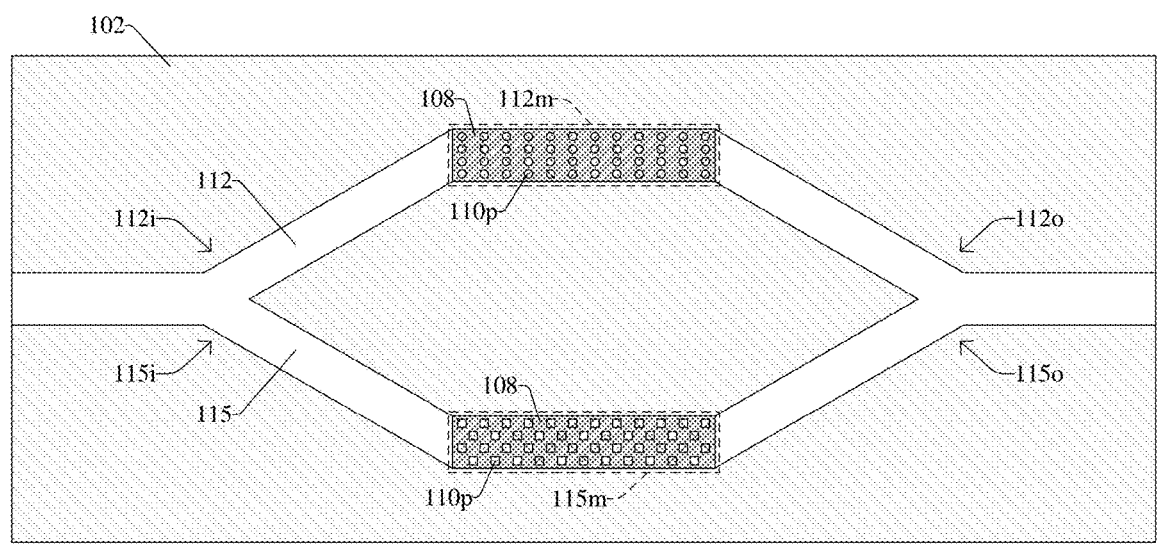
FIG. 3 illustrates a top view of some embodiments of a photonic device having a first waveguide and a second waveguide that include a plurality of doped pillar structures extending into a lower doped structure.

FIG. 3 illustrates a top view of some embodiments of a photonic device 300 corresponding to some alternative embodiments of the photonic device 100 of FIGS. 1A-1B, in which the plurality of doped pillar structures 110p within the first modulation region 112m of the first waveguide 112 have a first shape (e.g., circular) and the plurality of doped pillar structures 110p within the second modulation region 115m of the second waveguide 115 have a second shaped (e.g., rectangular) different from the first shape.

FIGS. 4A-4B through FIGS. 10A-10B illustrate a series of various views of some embodiments of a first method for forming a photonic device having a first waveguide that comprises a plurality of doped pillar structures extending into a lower doped structure according to the present disclosure. Figures with a suffix of "A" illustrate a cross-sectional view of the photonic device during various formation processes. Figures with a suffix of "B" illustrate a top view taken along the line A-A' of Figs. with a suffix of "A". Although the various views shown in FIGS. 4A-4B through 10A-10B are described with reference to a first method of forming the photonic device, it will be appreciated that the structures shown in FIGS. 4A-4B through 10A-10B are not limited to the first method of formation but rather may stand alone separate of the first method. Further, although FIGS. 4A-4B through 10A-10B are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 4A:
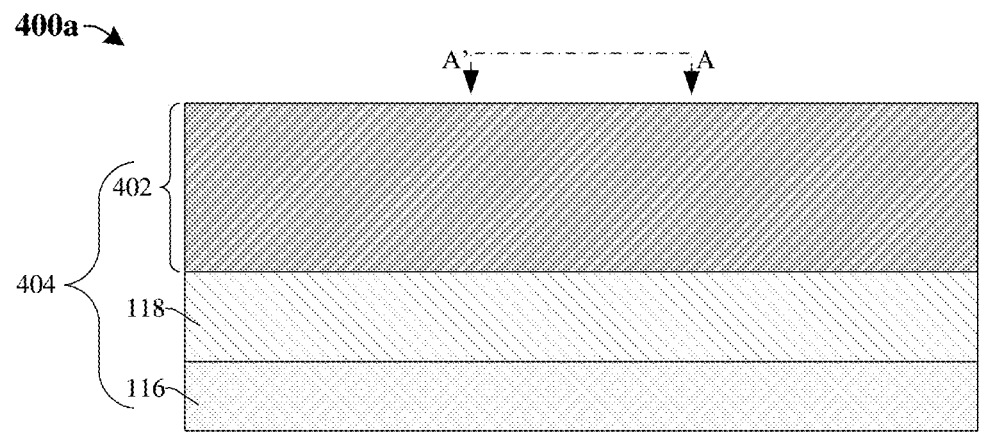
FIGS. 4A-4B through 10A-10B illustrate various views of some embodiments of a first method for forming a photonic device having a first waveguide that comprises a plurality of doped pillar structures extending into a lower doped structure.
Figure 4B:
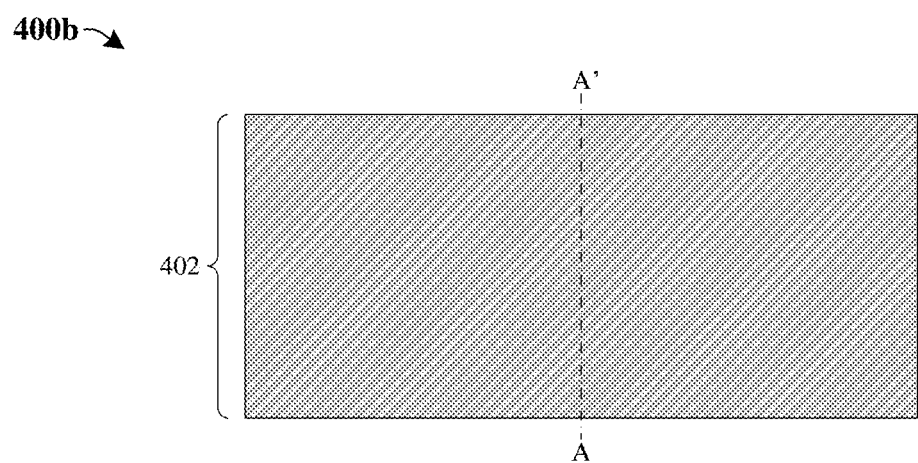

As shown in cross-sectional view 400a and top view 400b of FIGS. 4A-4B, a semiconductor substrate structure 404 is provided. In some embodiments, the semiconductor substrate structure 404 may, for example, be or comprise a silicon-on-insulator (SOI) substrate. The semiconductor substrate structure 404 comprise a substrate 116, a bulk dielectric structure 118, and a device layer 402. The bulk dielectric structure 118 is disposed between the substrate 116 and the device layer 402. In some embodiments, the bulk dielectric structure 118 is formed over the substrate 116 and the device layer 402 is formed over the bulk dielectric structure 118. The substrate 116 and the device layer 402 may, for example, be or comprise intrinsic silicon, bulk silicon, monocrystalline silicon, doped silicon, another suitable bulk substrate material, or the like. In some embodiments, an ion implantation process may be performed on the device layer 402 such that the device layer 402 has a first doping type (e.g., n-type). In further embodiments, the device layer 402 is doped with arsenic, phosphorus, some other suitable n-type dopants, or any combination of the foregoing with a doping concentration of approximately $1 \times 10^{17}$ to approximately $1 \times 10^{18}$ atoms/cm$^3$, or another suitable doping concentration value.

Figure 5A:
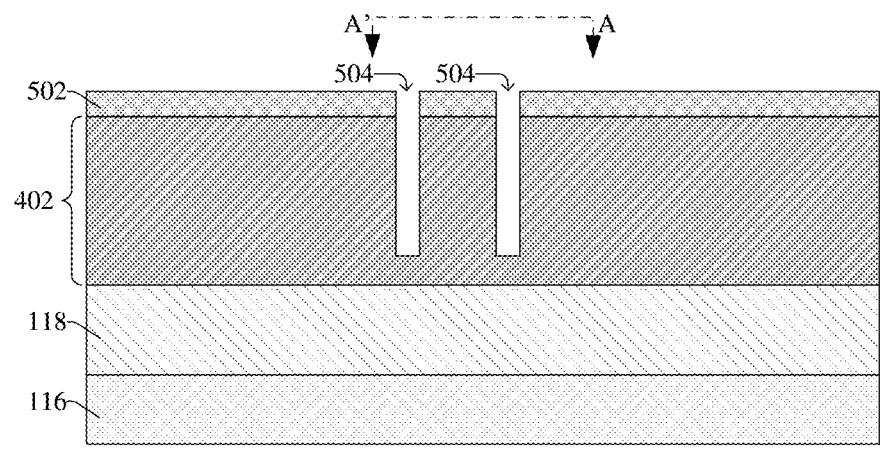
Figure 5B:
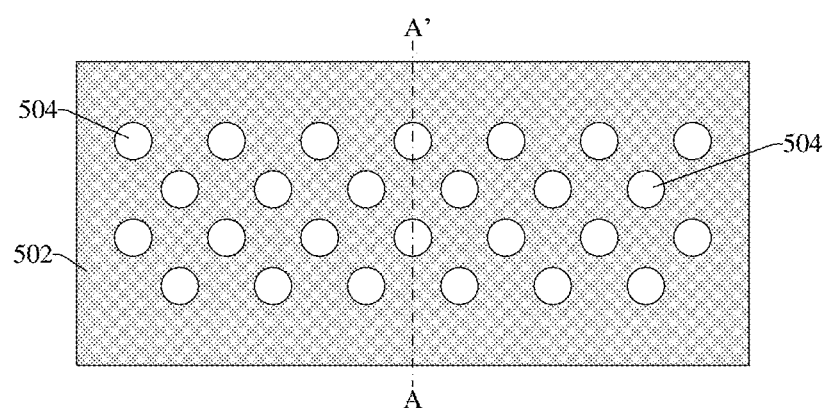

As shown in cross-sectional view 500a and top view 500b of FIGS. 5A-5B, a patterning process is performed on the device layer 402, thereby forming a plurality of openings 504 within the device layer 402. In some embodiments, the patterning process includes: forming a masking layer 502 over the device layer 402; and performing an etch process on the device layer 402 according to the masking layer 502, thereby defining the plurality of openings 504. In some embodiments, the etch process includes performing a dry etch, a wet etch, or any combination of the foregoing.

Figure 5C:
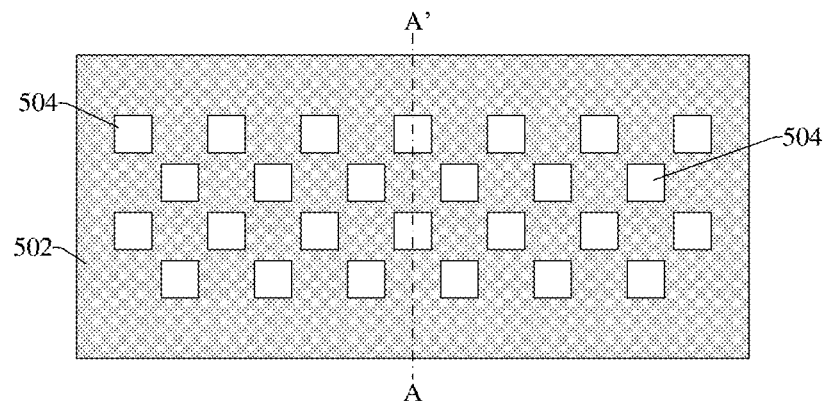

FIG. 5C illustrates a top view 500c corresponding to some other embodiments of the cross-sectional view 500a of FIG. 5A taken along line A-A' of FIG. 5A, where the openings 504 have a rectangular shape when viewed from above.

Figure 5D:
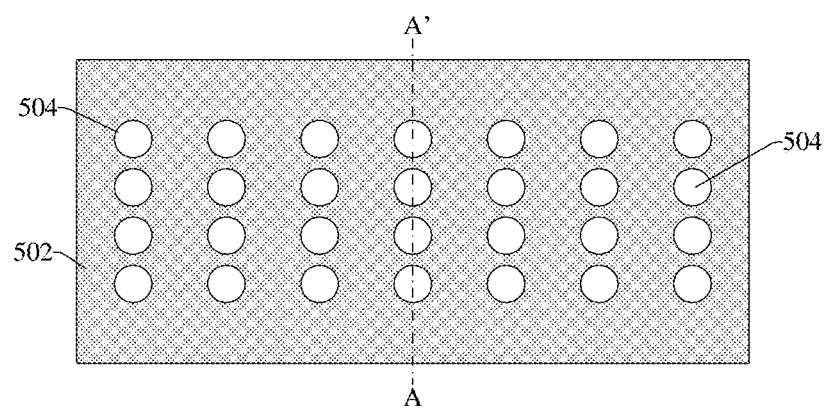

FIG. 5D illustrates a top view 500d corresponding to yet other embodiments of the cross-sectional view 500a of FIG. 5A taken along line A-A' of FIG. 5A, where the openings 504 have a circular shape when viewed from above.

Figure 6A:
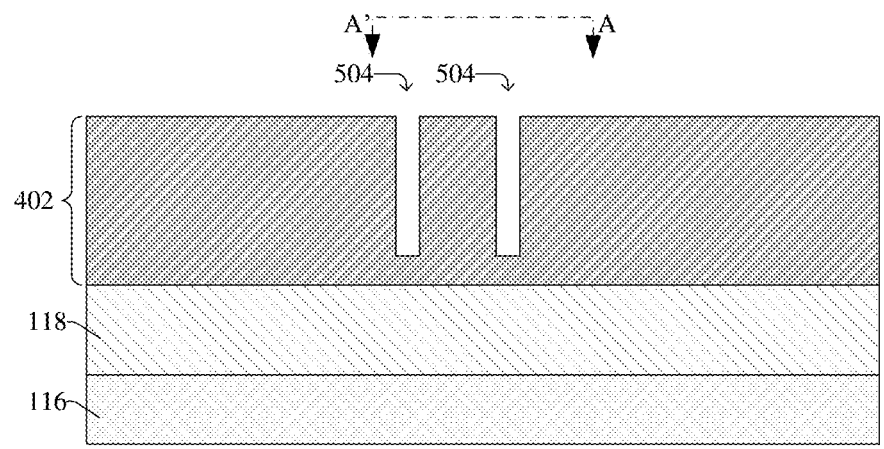
Figure 6B:
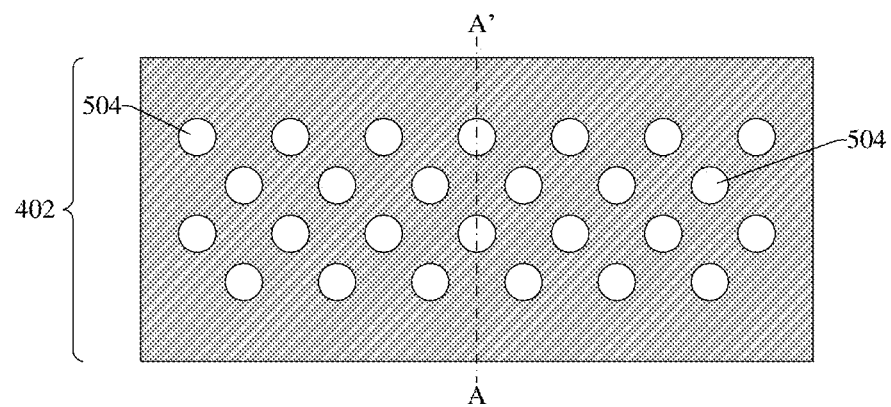

As shown in cross-sectional view 600a and top view 600b of FIGS. 6A-6B, a removal process is performed to remove the masking layer (502 of FIGS. 5A-5B) from over the device layer 402. In some embodiments, the removal process includes performing a wet ash process and/or a dry ash process, or another suitable removal process.

Figure 7A:
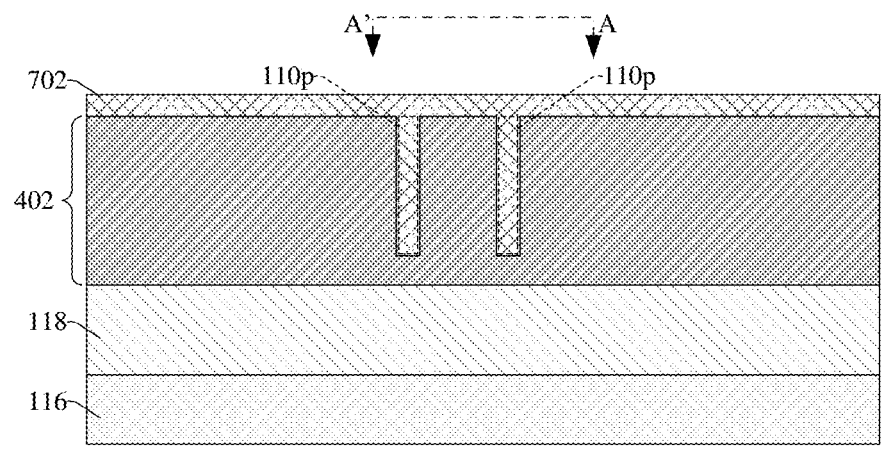
Figure 7B:
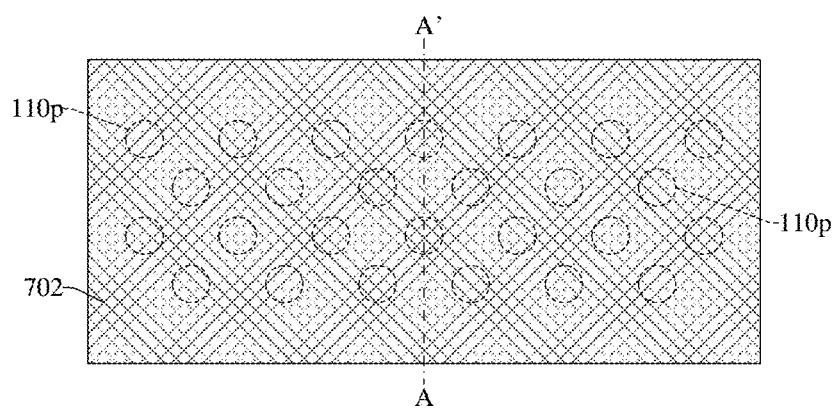

As shown in cross-sectional view 700a and top view 700b of FIGS. 7A-7B, a polysilicon layer 702 is formed over the device layer 402 and fills the plurality of openings (504 of FIGS. 6A-6B). In various embodiments, the polysilicon layer 702 is deposited over the device layer 402 by an epitaxial process (e.g., molecular beam epitaxy (MBE), vapor phase epitaxy (VPE), liquid phase epitaxy (LPE), etc.) and/or another form of a deposition process (e.g., chemical vapor deposition (CVD), atomic layer deposition (ALD), physical vapor deposition (PVD), etc.). In yet further embodiments, the polysilicon layer 702 may, for example, be or comprise polycrystalline silicon, or another suitable semiconductor material and has a second doping type (e.g., p-type) opposite the first doping type. In some embodiments, the first doping type is n-type and the second doping type is p-type, or vice versa. In yet further embodiments, the polysilicon layer 702 is doped with boron, indium, some other suitable p-type dopants, or any combination of the foregoing with a doping concentration of approximately $1 \times 10^{17}$ to approximately $1 \times 10^{18}$ atoms/cm$^3$, or another suitable doping concentration value. The polysilicon layer 702 may be grown (or deposited) and in-situ doped with the second doping type. In yet further embodiments, forming the polysilicon layer 702 over the device layer 402 forms a plurality of doped pillar structures 110p within the plurality of openings (504 of FIGS. 6A-6B) such that the device layer 402 continuously laterally wraps around and cups each doped pillar structure in the plurality of doped pillar structures 110p. In various embodiments, an upper portion of the polysilicon layer 702 overlying a top surface of the device layer 402 may be referred to as an upper doped layer or an upper doped region.

Figure 8A:
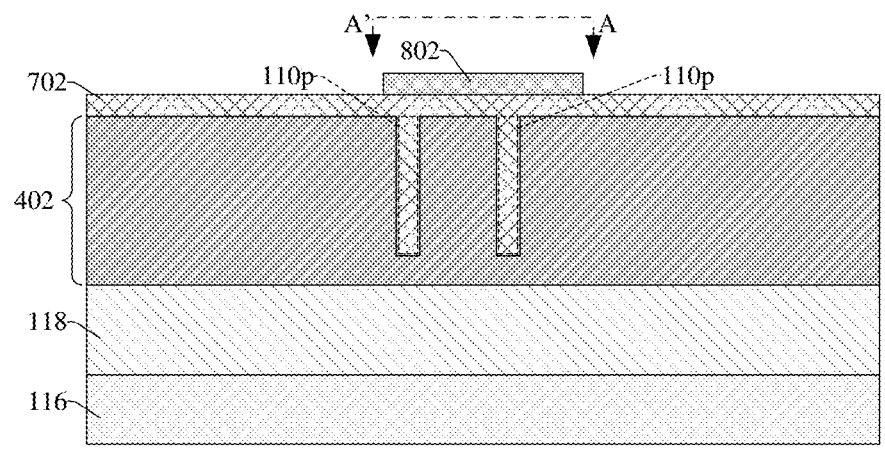
Figure 8B:
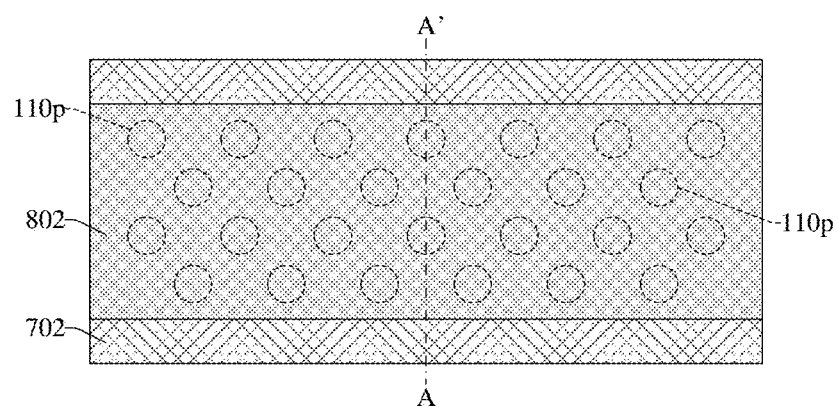

As shown in cross-sectional view 800a and top view 800b of FIGS. 8A-8B, a masking layer 802 is formed over the polysilicon layer 702. In various embodiments, the masking layer 802 directly overlies the plurality of doped pillar structures 110p.

Figure 9A:
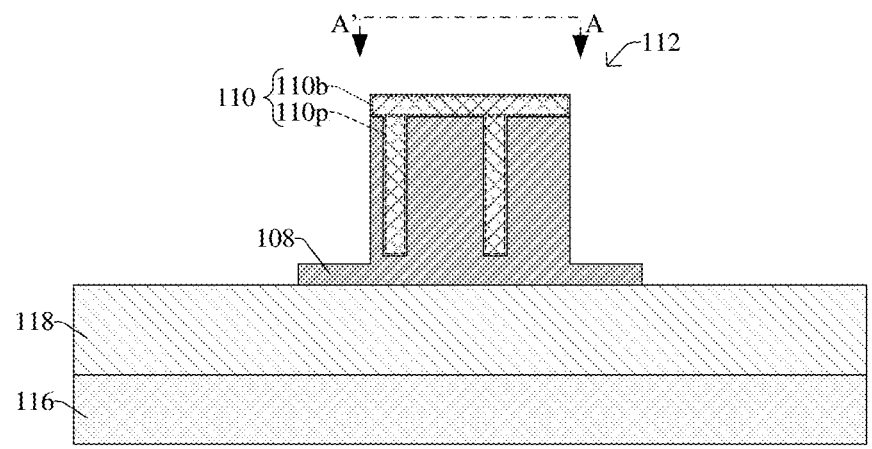
Figure 9B:
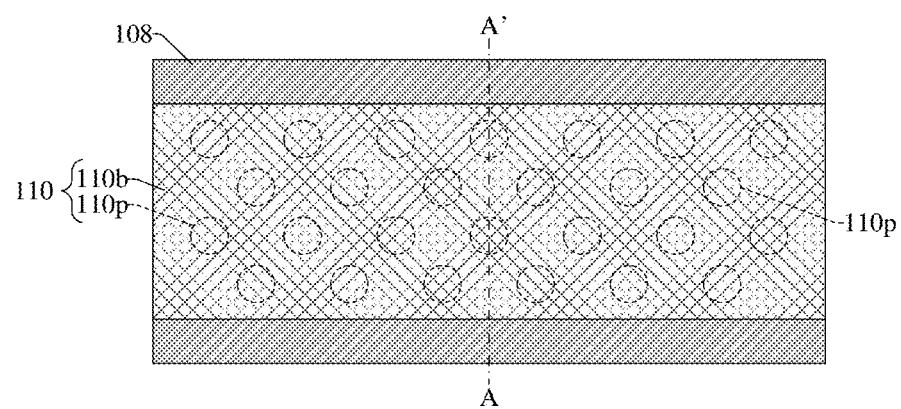

As shown in cross-sectional view 900a and top view 900b of FIGS. 9A-9B, a patterning process is performed on the polysilicon layer (702 of FIGS. 8A-8B) and the device layer (402 of FIGS. 8A-8B) according to the masking layer (802 of FIGS. 8A-8B), thereby defining a first waveguide 112 that comprises an upper doped structure 110 and a lower doped structure 108. In some embodiments, the patterning process includes performing a dry etch process, a wet etch process, another suitable etch process, or any combination of the foregoing. Further, the upper doped structure 110 comprises an upper doped body structure 110b and the plurality of doped pillar structures 110p, where the plurality of doped pillar structures 110p continuously extend from the upper doped body structure 110b into the lower doped structure 108. In some embodiments, a process for forming the upper doped structure 110 and/or the lower doped structure 108 includes at least a portion of the processing steps illustrated and/or described in FIGS. 4A-4B through 9A-9B.

Figure 10A:
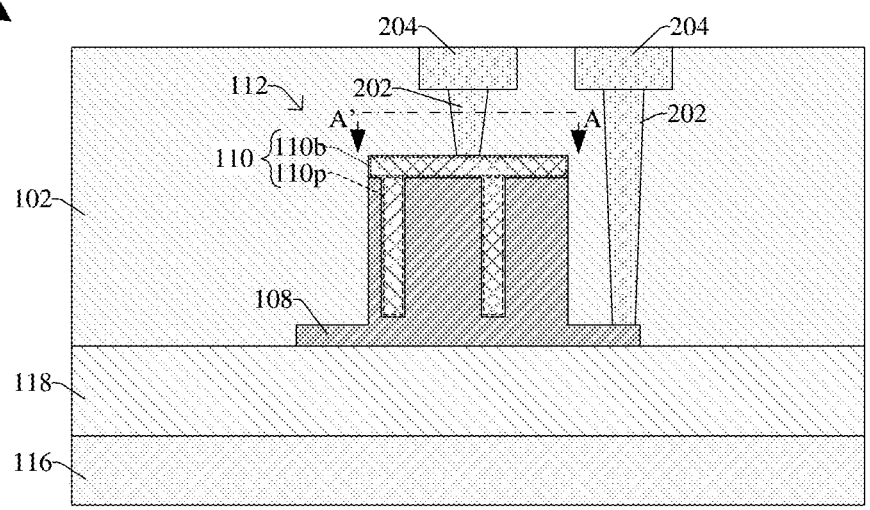
Figure 10B:
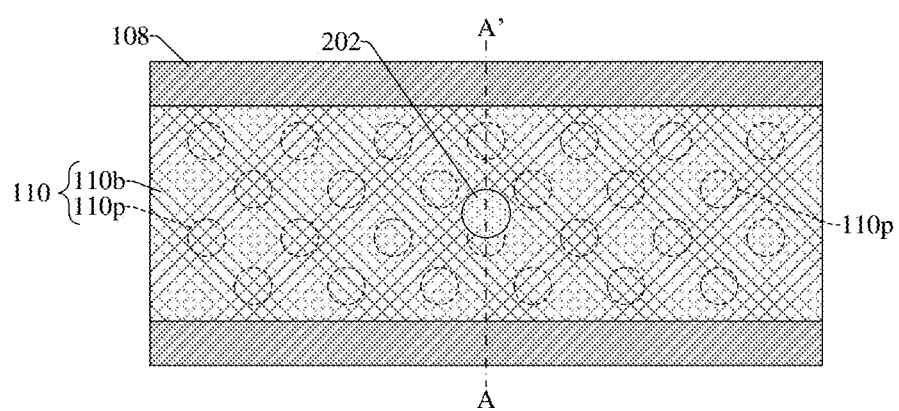

As shown in cross-sectional view 1000a and top view 1000b of FIGS. 10A-10B, a dielectric structure 102 is formed over the first waveguide 112 and the substrate 116. Further, a plurality of conductive vias 202 and a plurality of conductive wires 204 are formed within the dielectric structure 102 and over the first waveguide 112. In various embodiments, the dielectric structure 102 may be formed over the substrate 116 by a CVD process, a PVD process, an ALD process, or another suitable deposition or growth process. In further embodiments, the plurality of conductive vias 202 and the plurality of conductive wires 204 may be formed by one or more patterning process, one or more deposition processes, and/or other suitable fabrication processes. For clarity and ease of illustration, the dielectric structure 102 is omitted from the top view 1000b of FIG. 10B.

FIGS. 11A-11D through FIGS. 15A-15B illustrate a series of various views of some embodiments of a second method for forming a photonic device having a first waveguide that comprises a plurality of doped pillar structures extending into a lower doped structure according to the present disclosure. Figures with a suffix of "A" illustrate a cross-sectional view of the photonic device during various formation processes. Figures with a suffix of "B" illustrate a top view taken along the line A-A' of Figs. with a suffix of "A". Although the various views shown in FIGS. 11A-11D through FIGS. 15A-15B are described with reference to a second method of forming the photonic device, it will be appreciated that the structures shown in FIGS. 11A-11D through FIGS. 15A-15B are not limited to the second method of formation but rather may stand alone separate of the second method. Further, although FIGS. 11A-11D through FIGS. 15A-15B are described as a series of acts, it will be appreciated that these acts are not limited in that the order of the acts can be altered in other embodiments, and the methods disclosed are also applicable to other structures. In other embodiments, some acts that are illustrated and/or described may be omitted in whole or in part.

Figure 11A:
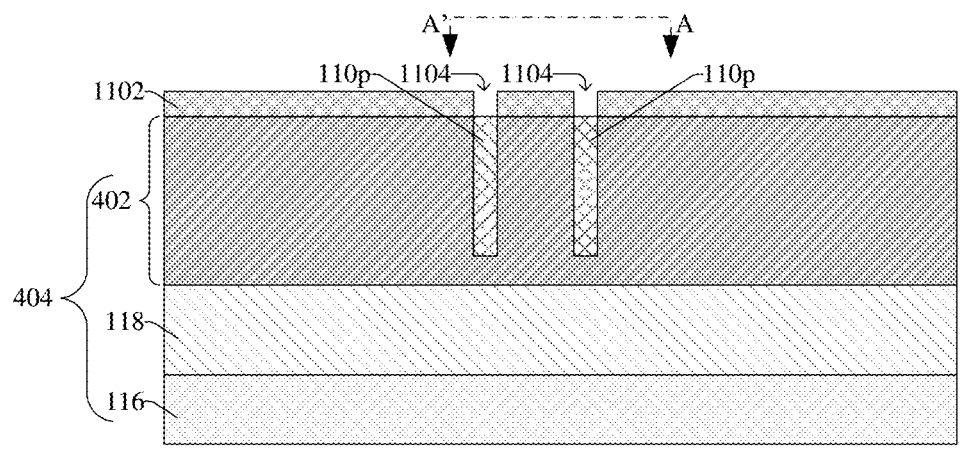
FIGS. 11A-11D through 15A-15B illustrate various views of some embodiments of a second method for forming a photonic device having a first waveguide that comprises a plurality of doped pillar structures extending into a lower doped structure.
Figure 11B:
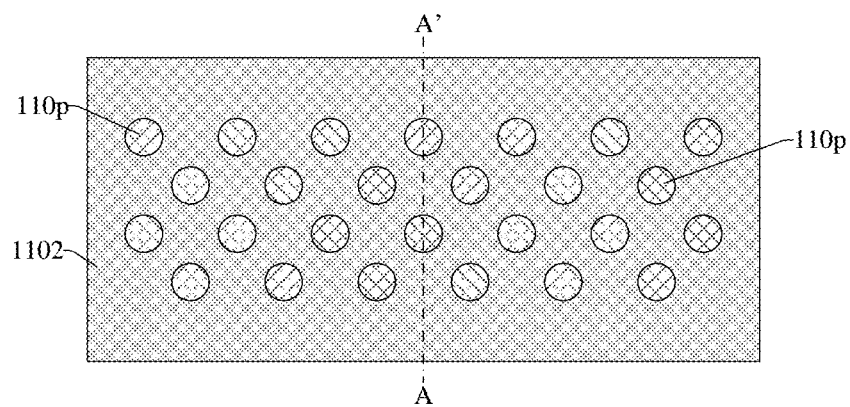

As shown in cross-sectional view 1100a and top view 1100b of FIGS. 11A-11B, a semiconductor substrate structure 404 having a device layer 402 is provided and an ion implant process is performed on the device layer 402 to form a plurality of doped pillar structures 110p within the device layer 402. The semiconductor substrate structure 404 comprise a substrate 116, a bulk dielectric structure 118, and the device layer 402, where the device layer 402 has a first doping type (e.g., n-type). Further, the semiconductor substrate structure 404 may be formed as illustrated and/or described in FIGS. 4A-4B. In further embodiments, the ion implant process includes: forming a masking layer 1102 over the device layer 402, such that the masking layer 1102 has a plurality of sidewalls defining a plurality of openings 1104; and selectively implanting ions into the device layer 402 according to the masking layer 1102, thereby forming the plurality of doped pillar structures 110p within the device layer 402. In various embodiments, the plurality of doped pillar structures 110p has a second doping type (e.g., p-type) opposite the first doping type (e.g., n-type). In further embodiments, the first doping type is n-type and the second doping type is p-type, or vice versa. Further, selectively implanting ions into the device layer 402 to form the doped pillar structures 110p may include doping the device layer 402 with boron, indium, some other suitable p-type dopants, or any combination of the foregoing with a doping concentration of approximately $1 \times 10^{17}$ to approximately $1 \times 10^{18}$ atoms/cm$^3$, or another suitable doping concentration value.

Figure 11C:
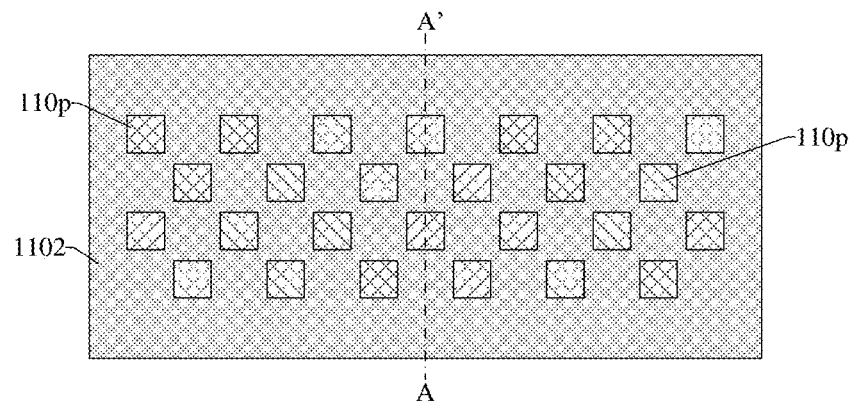

FIG. 11C illustrates a top view 1100c corresponding to some other embodiments of the cross-sectional view 1100a of FIG. 11A taken along line A-A' of FIG. 11A, where the doped pillar structures 110p have a rectangular shape when viewed from above.

Figure 11D:
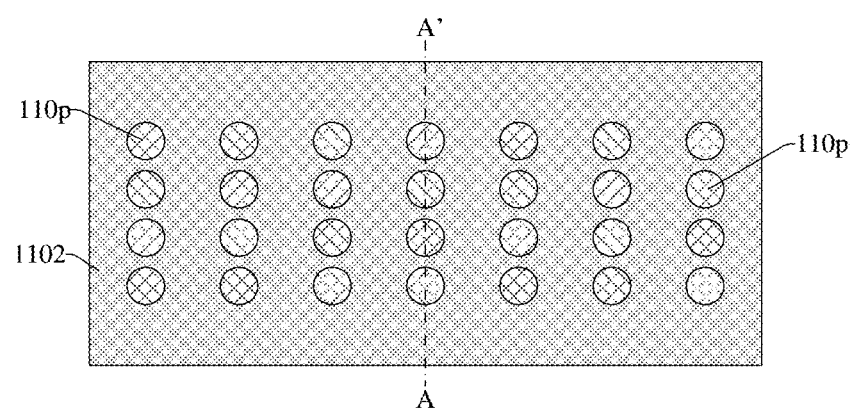

FIG. 11D illustrates a top view 1100d corresponding to yet other embodiments of the cross-sectional view 1100a of FIG. 11A taken along line A-A' of FIG. 11A, where the doped pillar structures 110p have a circular shape when viewed from above.

Figure 12A:
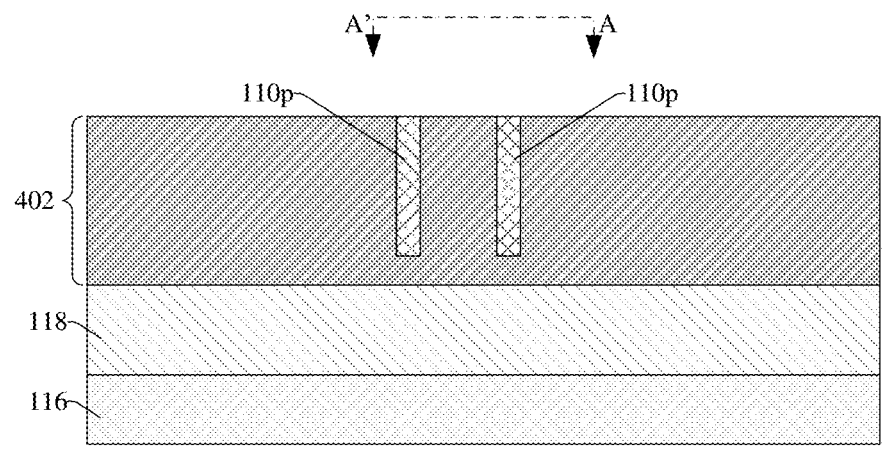
Figure 12B:
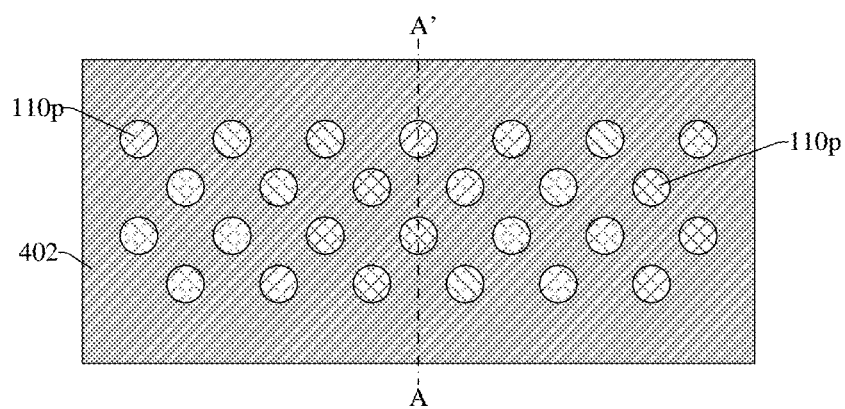

As shown in cross-sectional view 1200a and top view 1200b of FIGS. 12A-12B, a removal process is performed to remove the masking layer (1102 of FIGS. 11A-11B) from over the device layer 402. In some embodiments, the removal process includes performing a wet ash process and/or a dry ash process, or another suitable removal process.

Figure 13A:
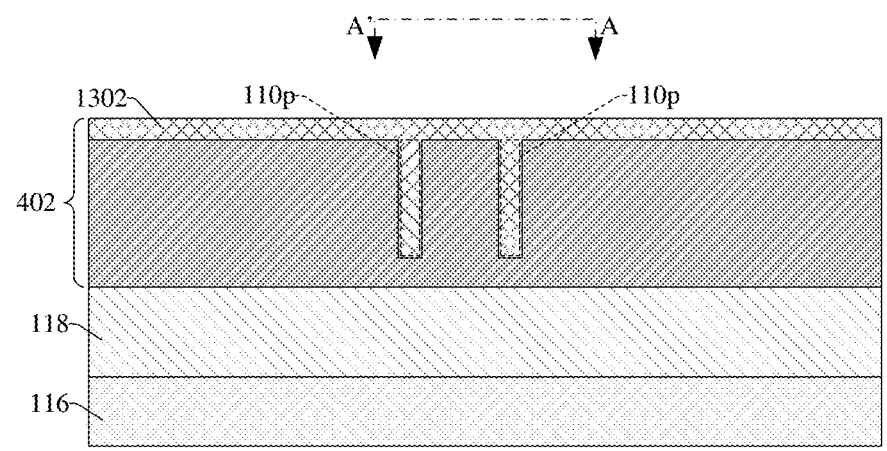
Figure 13B:
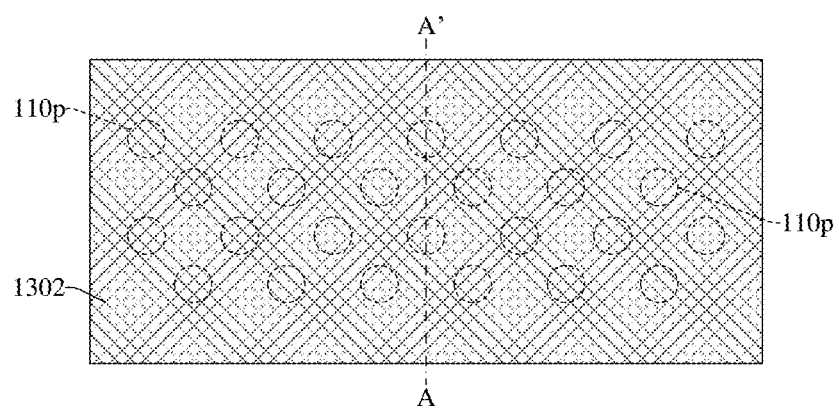

As shown in cross-sectional view 1300a and top view 1300b of FIGS. 13A-13B, an ion implantation process is performed on the device layer 402 to form an upper doped region 1302 within the device layer 402. In various embodiments, the ion implantation process includes selectively implanting dopants (e.g., boron, indium, some other suitable p-type dopants) within the device layer 402 such that the upper doped region 1302 has the second doping type (e.g., p-type). In some embodiments, the upper doped region 1302 comprises the second doping type with a doping concentration of approximately $1 \times 10^{17}$ to approximately $1 \times 10^{18}$ atoms/cm$^3$, or another suitable doping concentration value. In various embodiments, the upper doped region 1302 of the device layer 402 may be referred to as an upper doped layer.

Figure 14A:
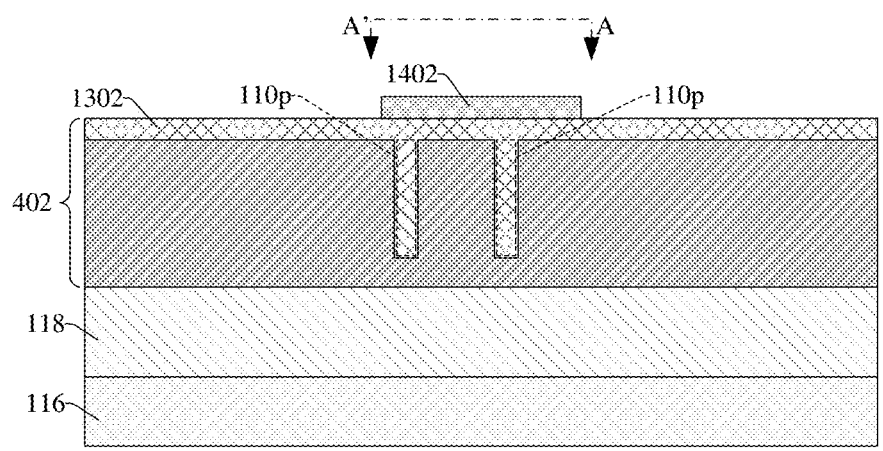
Figure 14B:
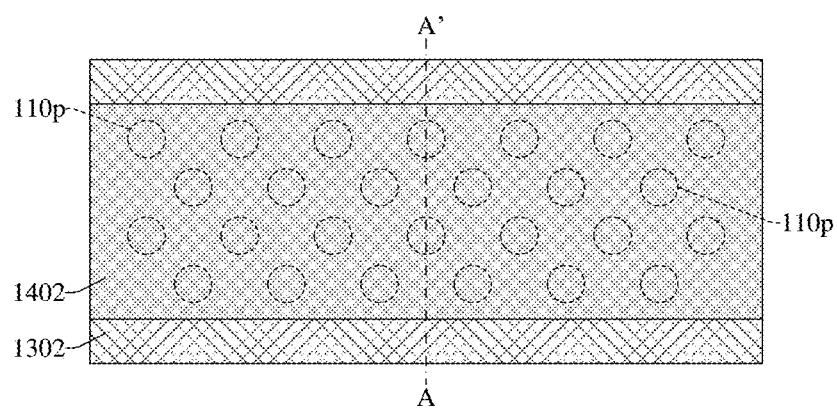

As shown in cross-sectional view 1400a and top view 1400b of FIGS. 14A-14B, a masking layer 1402 is formed over the upper doped region 1302. In various embodiments, the masking layer 1402 directly overlies the plurality of doped pillar structures 110p.

Figure 15A:
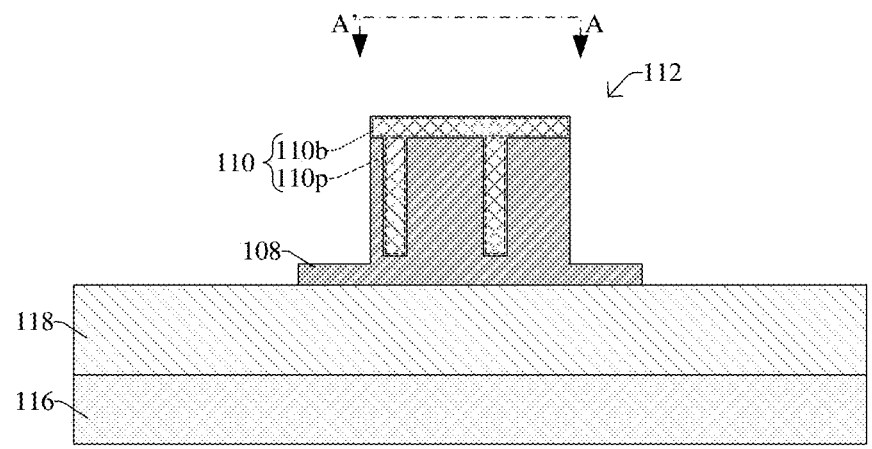
Figure 15B:
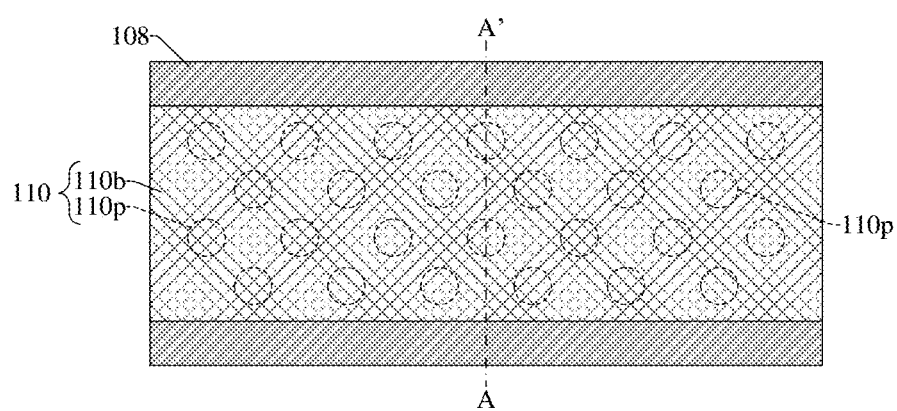

As shown in cross-sectional view 1500a and top view 1500b of FIGS. 15A-15B, a patterning process is performed on the upper doped region (1302 of FIGS. 14A-14B) and the device layer (402 of FIGS. 14A-14B) according to the masking layer (1402 of FIGS. 14A-14B), thereby defining a first waveguide 112 that comprises an upper doped structure 110 and a lower doped structure 108. In some embodiments, the patterning process includes performing a dry etch process, a wet etch process, another suitable etch process, or any combination of the foregoing. Further, the upper doped structure 110 comprises an upper doped body structure 110b and the plurality of doped pillar structures 110p, where the plurality of doped pillar structures 110p continuously extend from the upper doped body structure 110b into the lower doped structure 108. In some embodiments, a process for forming the upper doped structure 110 and/or the lower doped structure 108 includes at least a portion of the processing steps illustrated and/or described in FIGS. 11A-11D through 14A-14B. In further embodiments, a dielectric structure (e.g., 102 of FIGS. 10A-10B), a plurality of conductive vias (e.g., 202 of FIGS. 10A-10B), and a plurality of conductive wires (e.g., 204 of FIGS. 10A-10B) are formed over the first waveguide 112 as illustrated and/or described in FIGS. 10A-10B.

Figure 16:
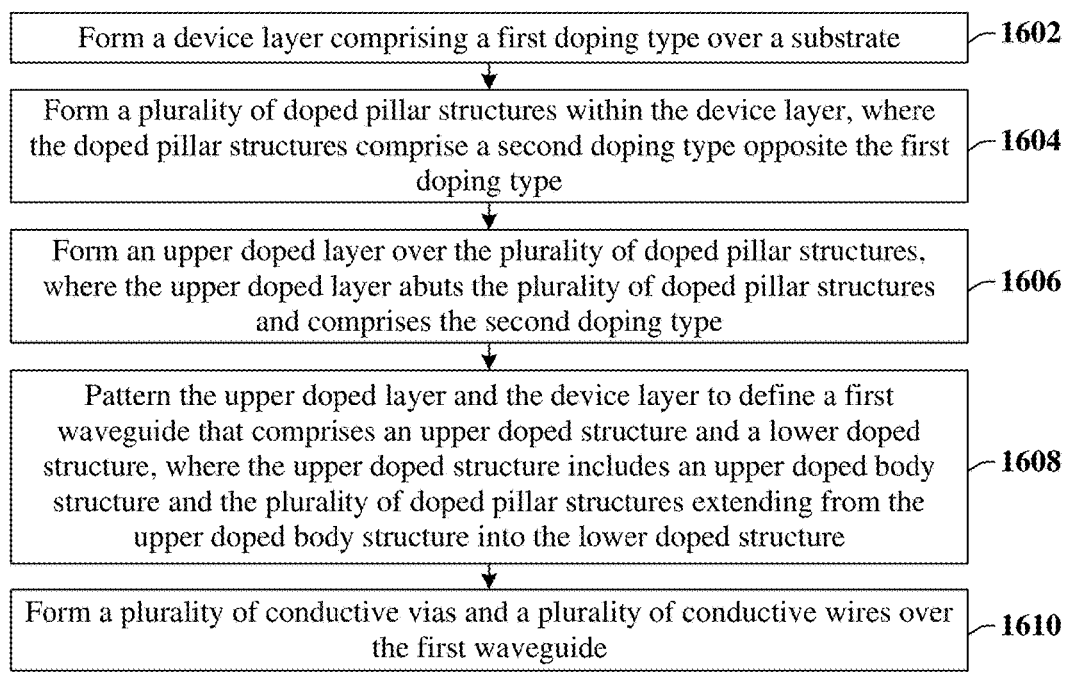
FIG. 16 illustrates a flow diagram of some embodiments corresponding to a method for forming a photonic device having a first waveguide that comprises a plurality of doped pillar structures extending into a lower doped structure.

FIG. 16 illustrates a method 1600 for forming a photonic device having a first waveguide that comprises a plurality of doped pillar structures extending into a lower doped structure according to the present disclosure. Although the method 1600 is illustrated and/or described as a series of acts or events, it will be appreciated that the method is not limited to the illustrated ordering or acts. Thus, in some embodiments, the acts may be carried out in different orders than illustrated, and/or may be carried out concurrently. Further, in some embodiments, the illustrated acts or events may be subdivided into multiple acts or events, which may be carried out at separate times or concurrently with other acts or sub-acts. In some embodiments, some illustrated acts or events may be omitted, and other un-illustrated acts or events may be included.

At act 1602, a device layer comprising a first doping type is formed over a substrate. FIGS. 4A-4B illustrate various views of some embodiments corresponding to act 1602.

At act 1604, a plurality of doped pillar structures is formed within the device layer, where the doped pillar structures comprise a second doping type opposite the first doping type. FIGS. 5A-5D through 7A-7B illustrate various views of some embodiments corresponding to act 1604. FIGS. 11A-11D illustrate various views of some embodiments corresponding to act 1604.

At act 1606, an upper doped layer is formed over the plurality of doped pillar structures, where the upper doped layer abuts the plurality of doped pillar structures and comprises the second doping type. FIGS. 7A-7B illustrate various views of some embodiments corresponding to act 1606. FIGS. 13A-13B illustrate various views of some embodiments corresponding to act 1606.

At act 1608, the upper doped layer and the device layer are patterned, thereby defining a first waveguide that comprises an upper doped structure and a lower doped structure, where the upper doped structure includes an upper doped body structure and the plurality of doped pillar structures extending from the upper doped body structure into the lower doped structure. FIGS. 8A-8B through 9A-9B illustrate various views of some embodiments corresponding to act 1608. FIGS. 14A-14B through 15A-15B illustrate various views of some embodiments corresponding to act 1608.

At act 1610, a plurality of conductive vias and a plurality of conductive wires are formed over the first waveguide. FIGS. 10A-10B illustrate various views of some embodiments corresponding to act 1610.

Accordingly, in some embodiments, the present disclosure relates to a photonic device having a first waveguide that comprises an upper doped structure and a lower doped structure, where the upper doped structure includes an upper doped body structure and a plurality of doped pillar structures extending from the upper doped body structure into the lower doped structure.

In some embodiments, the present application provides a semiconductor structure comprising a waveguide having an input region and an output region, wherein the input region is configured to receive light, wherein the waveguide includes a lower doped structure comprising a first doping type; and a plurality of doped pillar structures disposed within the lower doped structure, wherein the doped pillar structures comprise a second doping type opposite the first doping type, and wherein the doped pillar structures extend from a top surface of the lower doped structure to a point below the top surface of the lower doped structure.

In some embodiments, the present application provides a photonic device including an input terminal configured to receive impingent light; a first waveguide having a first input region coupled to the input terminal, wherein the first waveguide comprises a first modulation region; a second waveguide having a second input region coupled to the input terminal, wherein the second waveguide comprises a second modulation region, wherein the first waveguide and the second waveguide respectively comprise an upper doped structure and a lower doped structure in the first modulation region and the second modulation region; and wherein the upper doped structure comprises a plurality of doped pillar structures extending into the lower doped structure, wherein the lower doped structure abuts the plurality of doped pillar structures at PN junctions.

In some embodiments, the present application provides a method for forming a photonic device, the method includes: forming a device layer comprising a first doping type over a substrate; forming a plurality of doped pillar structures within the device layer, wherein the plurality of doped pillar structures comprises a second doping type opposite the first doping type; forming an upper doped body structure over the plurality of doped pillar structures, wherein the upper doped body structure comprises the second doping type; and patterning the device layer to form a lower doped structure underlying the upper doped body structure, wherein the plurality of doped pillar structures is disposed within the lower doped structure.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A semiconductor structure comprising:
 a substrate;
 an input terminal trunk structure comprising a first linear segment as viewed from a top view of the semiconductor structure, wherein the input terminal trunk structure is arranged over the substrate and extends in a first direction in parallel to an upper surface of the substrate;
 an output terminal trunk structure comprising a second linear segment that is co-linear with the first linear segment and laterally spaced apart from the first linear segment as viewed from the top view;
 a first waveguide having an input region that branches off an end of the input terminal trunk structure, an output region that merges with an end of the output terminal trunk structure, and a first modulation region between the input region of the first waveguide and the output region of the first waveguide as viewed from the top view, wherein the first modulation region is configured to receive light from the input region of the first waveguide and transfer the received light along the first direction towards the output region of the first waveguide, a second waveguide having an input region that branches off the end of the input terminal trunk structure, an output region that merges with the end of the output terminal trunk structure, and a second modulation region between the input region of the second waveguide and the output region of the second waveguide as viewed from the top view, wherein the second modulation region is configured to receive light from the input region of the second waveguide and transfer the light in the first direction towards the output region of the second waveguide;
 wherein the first modulation region comprises:
  a lower doped body structure comprising a first doping type, the lower doped body structure including a plurality of openings defined by inner sidewalls and bottom surfaces within the lower doped body structure when viewed in a cross-sectional view taken in a second direction, the second direction being parallel to the upper surface of the substrate and perpendicular to the first direction of light propagation;

an upper doped body structure comprising a second doping type and overlying the lower doped body structure, the second doping type being opposite the first doping type; and a first plurality of doped pillar structures disposed within the plurality of openings, respectively, wherein the doped pillar structures comprise the second doping type and extend in a third direction from a lower surface of the upper doped body structure to directly contact the bottom surfaces and inner sidewalls of the openings of the lower doped body structure when viewed in the cross-sectional view, the third direction being perpendicular to the first direction in which the light propagates, wherein the doped pillar structures are arranged in a first array comprising at least two rows of the doped pillar structures and at least two columns of the doped pillar structures as viewed from the top view, wherein the at least two columns are spaced laterally from one another along the first direction and the at least two rows are spaced laterally from one another along the second direction, wherein a first distance in the first direction between two adjacent columns in the at least two columns is greater than a width in the first direction of an individual doped pillar structure in the first plurality of doped pillar structures, wherein a second distance in the second direction between an outer sidewall of the lower doped body structure and an outermost row in the at least two rows of the doped pillar structure is non-zero and less than the first distance, and wherein a third distance in the second direction between two directly adjacent rows in the at least two rows of the doped pillar structures is non-zero and less than the width of the individual doped pillar structure, and wherein the lower doped body structure and the plurality of doped pillar structures are formed of a same material doped with the first and second doping types, respectively.

2. The semiconductor structure of claim 1, wherein the third distance is less than half a width of the lower doped body structure.

3. The semiconductor structure of claim 1, wherein the lower doped body structure comprises:

a base region disposed over the substrate, the base region having a first width measured in the second direction; and a plateau region arranged on the base region, the plateau region having a second width measured in the second direction, the second width being less than the first width such that the lower doped body structure includes a ledge along its outer sidewall where the base region meets the plateau region, wherein the plurality of openings are arranged in the plateau region and the bottom surfaces of the plurality of openings are higher than the ledge.

4. The semiconductor structure of claim 3, further comprising:

a first metal line disposed directly over an upper surface of the upper doped body structure;

a second metal line disposed directly over the ledge of the lower doped body structure and spaced apart laterally from the first metal line;

a first contact extending from the first metal line to the upper surface of the upper doped body structure; and a second contact extending from the second metal line to the ledge of the lower doped body structure.

5. The semiconductor structure of claim 3, wherein the first modulation region includes a line in the first direction extending from a first end of the first modulation region nearest the input region of the first waveguide to a second end of the first modulation region nearest the output region of the first waveguide, wherein the line extends solely through semiconductor material of the first doping type throughout the plateau region without traversing a p-n junction.

6. The semiconductor structure of claim 1, wherein when viewed from the top view, the first plurality of doped pillar structures in the first waveguide have respective outer perimeters that are circular; and wherein when viewed from the top view, the second waveguide comprises a second plurality of doped pillar structures that are arranged in a second array comprising at least two rows of doped pillar structures and at least two columns of doped pillar structures, wherein the second plurality of doped pillar structures have respective outer perimeters that are rectangular, such that the outer perimeters of the second plurality of doped pillar structures have respective rectangular shapes that differ from respective circular shapes of the outer perimeters of the first plurality of doped pillar structures when viewed from the top view.

7. The semiconductor structure of claim 6, wherein when viewed from the top view, a first set of at least two parallel lines intersect the circular doped pillar structures of the at least two columns, respectively, of the first array, and wherein when viewed from the top view, the first set of the at least two parallel lines also intersect rectangular doped pillar structures of at least two columns, respectively, of the second array, and wherein the second array also includes additional rectangular doped pillar structures that are arranged on another line between nearest neighboring lines of the first set of parallel lines when viewed in the top view, and the another line is parallel to the first set of the at least two parallel lines, and wherein the another line traverses the first array without intersecting any doped pillar structures of the first array.

8. A photonic device comprising:

an input terminal configured to receive impingent light;

a first waveguide having a first input region coupled to the input terminal, wherein the first waveguide comprises a first modulation region and is configured to transfer the impingent light along a first direction, wherein the first waveguide comprises a first upper doped structure and a first lower doped structure in the first modulation region, wherein the first upper doped structure comprises a first upper doped body structure over a first plurality of doped pillar structures extending into the first lower doped structure, wherein the first plurality of doped pillar structures are arranged in a first array comprising a first plurality of rows and a first plurality of columns;

a second waveguide having a second input region coupled to the input terminal, wherein the second waveguide comprises a second modulation region, wherein the second waveguide comprises a second upper doped structure and a second lower doped structure in the second modulation region; and wherein the second upper doped structure comprises a second upper doped body structure over a second plurality of doped pillar structures extending into the second lower doped structure, wherein the second plurality of doped pillar structures are arranged in a second array comprising a second plurality of rows spaced from one another along a second direction orthogonal to the first direction and a second plurality of columns spaced from one another along the first direction, wherein the second lower doped structure abuts the second plurality of doped pillar structures at PN junctions, wherein the second lower doped structure continuously extends around and directly contacts outer perimeters of doped pillar structures in the second plurality of doped pillar structures, wherein a height of the second plurality of doped pillar structures is greater than a length and a width or a circumference of each doped pillar structure in the second plurality of doped pillar structures, wherein the second lower doped structure comprises a first outer sidewall elongated in the first direction, wherein a first minimum distance between the first outer sidewall and doped pillar structures in a first column of the second plurality of columns is less than a second minimum distance between the first outer sidewall and doped pillar structures in a second column of the second plurality of columns, and wherein when viewed in top view a first column of the first plurality of columns is laterally aligned with the first column of the second plurality of columns and a second column of the first plurality of columns is laterally aligned with a third column of the second plurality of columns, wherein the first plurality of doped pillar structures are laterally offset from a region directly between the first column of the first plurality of columns and the second column of the first plurality of columns, and wherein when viewed in top view the second column of the second plurality of columns is laterally aligned with the region and is spaced laterally between a first line aligned with the first column of the first plurality of columns and a second line aligned with the second column of the first plurality of columns, the second line parallel to the first line;

wherein when viewed from a top view, the first plurality of doped pillar structures in the first waveguide have respective outer perimeters that are circular; and wherein when viewed from the top view, the second plurality of doped pillar structures have respective outer perimeters that are rectangular, such that the rectangular outer perimeters of the second plurality of doped pillar structures have respective shapes that differ from respective shapes of the circular outer perimeters of the first plurality of doped pillar structures when viewed from the top view, and wherein the first and second lower doped structures and the first and second plurality of doped pillar structures are formed of a same material, and the first and second lower doped structures are doped with a first doping type and the first and second plurality of doped pillar structures are doped with a second doping type opposite the first doping type.

9. The photonic device of claim 8, wherein the first minimum distance is less than a width of an individual doped pillar structure in the second plurality of doped pillar structures and the second minimum distance is greater than the width of the individual doped pillar structure.

10. The photonic device of claim 8, wherein a height of the second upper doped body structure is less than a distance between a bottom surface of the second plurality of doped pillar structures and a bottom surface of the second lower doped structure.

11. The photonic device of claim 8, wherein the second lower doped structure has a doping concentration within a range of approximately $10^{17}$ to $10^{18}$ atoms/cm$^3$, wherein the second plurality of doped pillar structures has a doping concentration within a range of approximately $10^{17}$ to $10^{18}$ atoms/cm$^3$.

12. The photonic device of claim 8, wherein the doped pillar structures in the first column of the second plurality of columns are completely laterally offset from the pillar structures in the second column of the second plurality of columns along the first direction.

13. The photonic device of claim 8, further comprising:
a conductive via extending from above a top surface of the second upper doped structure and contacting a peripheral region of the second lower doped structure, wherein a bottom surface of the conductive via is vertically below a bottom surface of the second plurality of doped pillar structures.

14. The photonic device of claim 8, wherein a first number of rows in the first plurality of rows is equal to a second number of rows in the second plurality of rows, and a first number of columns in the first plurality of columns is less than a second number of columns in the second plurality of columns.

15. The photonic device of claim 8, wherein the second lower doped structure comprises a pair of upper outer sidewalls spaced apart by a first distance in the first direction and a pair of lower outer sidewalls elongated in the first direction and spaced apart by a second distance greater than the first distance to define an upwardly facing ledge along a sidewall of the second lower doped structure, and further comprising:
a first metal line disposed directly over an upper surface of the second upper doped body structure;
a first contact extending from the first metal line to the upper surface of the second upper doped body structure between the pair of upper outermost sidewalls;
a second metal line disposed directly over the upwardly facing ledge of the second lower doped structure and spaced apart laterally from the first metal line; and
a second contact extending from the second metal line to the upwardly facing ledge of the second lower doped structure.

16. A method for forming a photonic device, the method comprising:
forming a device layer comprising a first doping type over a substrate;
forming a plurality of doped pillar structures within the device layer, wherein the plurality of doped pillar structures comprises a second doping type opposite the first doping type, wherein the doped pillar structures are arranged in a first array comprising at least two rows of the doped pillar structures and at least two columns of the doped pillar structures and a second array comprising at least two additional rows of the doped pillar structures and at least two additional columns of the doped pillar structures, wherein the at least two columns comprises a first column laterally spaced from a second column in a first direction, wherein doped pillar structures in the first column are laterally staggered from doped pillar structures in the second column;
forming an upper doped body structure over the plurality of doped pillar structures, wherein the upper doped body structure comprises the second doping type; and
patterning the device layer to form a lower doped structure underlying the upper doped body structure, wherein the plurality of doped pillar structures is disposed within the lower doped structure, wherein the lower doped structure directly contacts the doped pillar structures, wherein a doping concentration of the plurality of doped pillar structures, a doping concentration of the upper doped body structure, and a doping concentration of the lower doped structure are equal, wherein the lower doped structure, the upper doped body structure, and the plurality of doped pillar structures at least partially define a waveguide configured to receive light, modulate the received light and transfer it along the first direction, wherein a longest dimension of each of the doped pillar structures is elongated in a second direction orthogonal to the first direction;

wherein when viewed from a top view, the first array of doped pillar structures have respective outer perimeters that are circular;

wherein when viewed from the top view, the second array of doped pillar structures have respective outer perimeters that are rectangular, such that the rectangular outer perimeters of the second array of doped pillar structures have respective shapes that differ from respective shapes of the circular outer perimeters of the first array of doped pillar structures when viewed from the top view, and wherein the lower doped structure and the plurality of doped pillar structures are formed of a same material doped with the first and second doping types, respectively.

17. The method of claim 16, wherein forming the plurality of doped pillar structures comprises:

forming a masking layer over the device layer;

etching the device layer according to the masking layer, thereby forming a plurality of openings within the device layer; and depositing a polysilicon layer over the device layer and within the openings, wherein the polysilicon layer directly contacts the device layer.

18. The method of claim 16, wherein the lower doped structure laterally wraps around and cups a bottom surface of each doped pillar structure in the plurality of doped pillar structures.

19. The method of claim 16, wherein the doped pillar structures in the first column are completely laterally offset from the doped pillar structures in the second column along the first direction.

* * * * *